United States Patent [19]

Lee

[11] Patent Number: 5,861,878

[45] Date of Patent: Jan. 19, 1999

[54] MODELED PAINTING BRUSH

[76] Inventor: Jintae Lee, C-303, 1-17-25 Matsunaga, Ikki-machi, Aizu-Wakamatsu, Fukushima 965-0001, Japan

[21] Appl. No.: 753,089

[22] Filed: Nov. 20, 1996

[51] Int. Cl.[6] .................................................. G09G 5/00
[52] U.S. Cl. ............................................................ 345/179
[58] Field of Search ..................................... 345/179, 145, 345/349, 977

[56] References Cited

U.S. PATENT DOCUMENTS 5,646,650  7/1997  Miller et al. ............................. 345/179

*Primary Examiner*—Mark K. Zimmerman
*Assistant Examiner*—Vincent E. Kovalick

[57] ABSTRACT

Disclosed is a graphically-modeled painting brush that has a shaft and one or more elastic bristles attached at the bottom of the shaft.

1 Claim, 1 Drawing Sheet (a)　　　(b)　　　(c)

MODELED PAINTING BRUSH

BACKGROUND OF THE INVENTION

For painting in the computer, two-dimensional patterns on computer screen controlled by the mouse or a stylus pen have hitherto been used, which is unnatural and inconvenient in that the user cannot see bristles of the brush while he/she is drawing. Present invention was made to provide a more natural and convenient painting tool.

SUMMARY OF THE INVENTION

Present invention is a graphically modeled painting brush that has a shaft and one or more bristles attached at the bottom of the shaft. The bristles transform like physical bristles as they interact with graphically modeled paper.

DETAILED DESCRIPTION OF THE INVENTION

Figure 1:
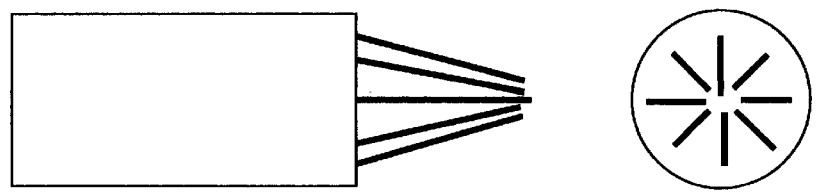
FIG. 1 is side view and front view of a sample brush.
Figure 2:
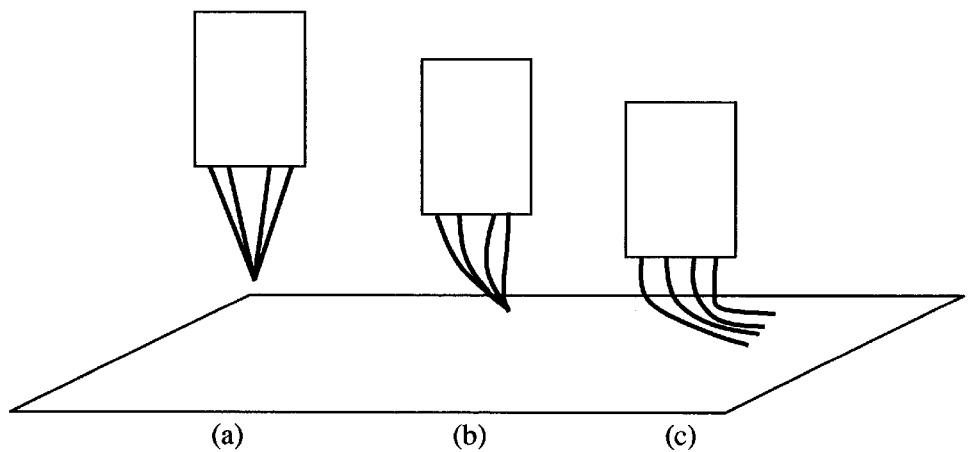
FIG. 2 views transformation of bristles of a brush. From left to right: (a) the brush is above modeled paper, (b) (c) the brush is pressed down gradually.
Figure 3:
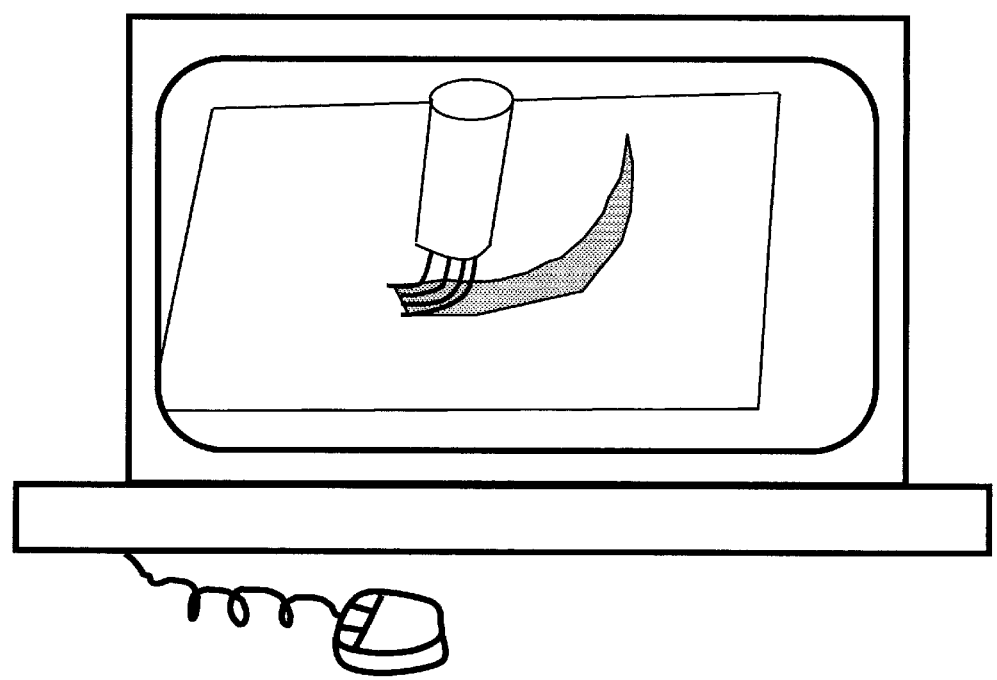
FIG. 3 is a scene of drawing that uses the sample brush illustrated in FIG. 2.

This invention is a graphically-modeled painting brush. It has a shaft and one or more bristles which are attached at the bottom of the shaft (FIG. 1). The bristles are modeled to transform as it collide with objects just like elastic bristles in the physical world do. By using this modeled brush, the drawing process becomes more natural and convenient because the user can see the change of bristles' shape as they collide with the paper or some object.

The size and shape of the shaft as well as the geometry, number, placement, and physical properties of the bristles can be varied to make brushes of different characteristics.

What is claimed is:

1. A graphically-modeled three-dimensional painting brush comprised of:

(a) an inflexible shaft (b) one or more deformable bristles with one end fixed at the undersurface of the said shaft.

* * * * *